Aug. 12, 1930.　　　C. A. DE GIERS　　　1,772,929
LIQUID LEVEL INDICATOR
Original Filed June 10, 1924　　3 Sheets-Sheet 1
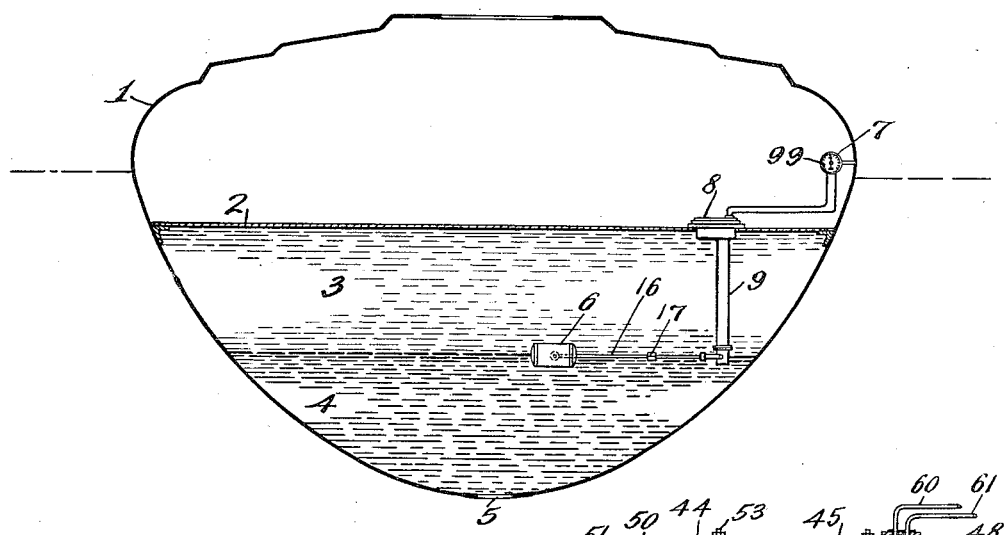
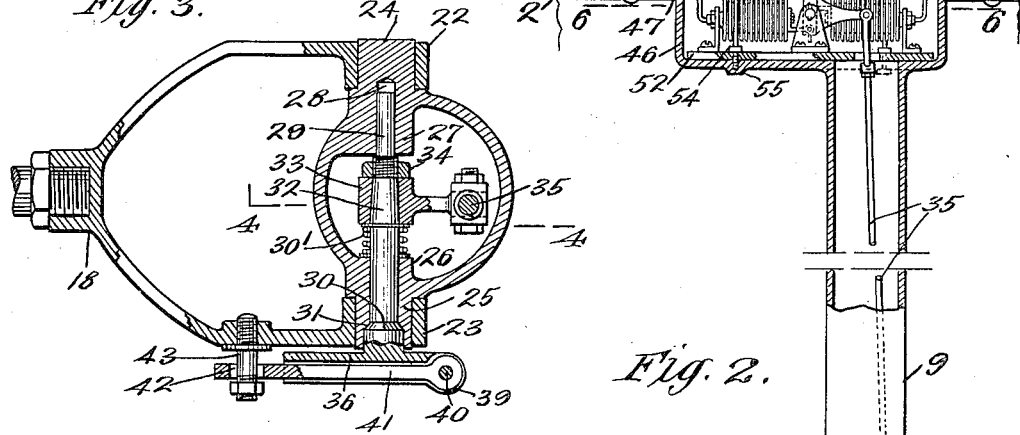
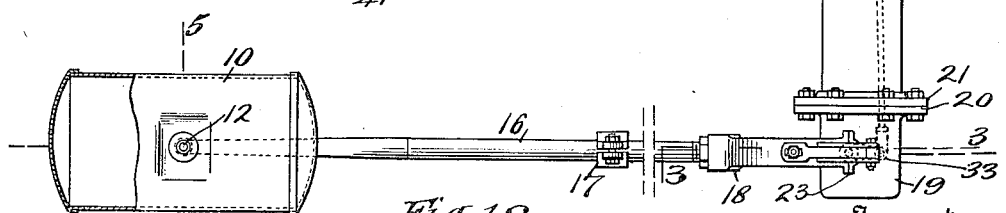

Aug. 12, 1930.  C. A. DE GIERS  1,772,929
LIQUID LEVEL INDICATOR
Original Filed June 10, 1924   3 Sheets-Sheet 2
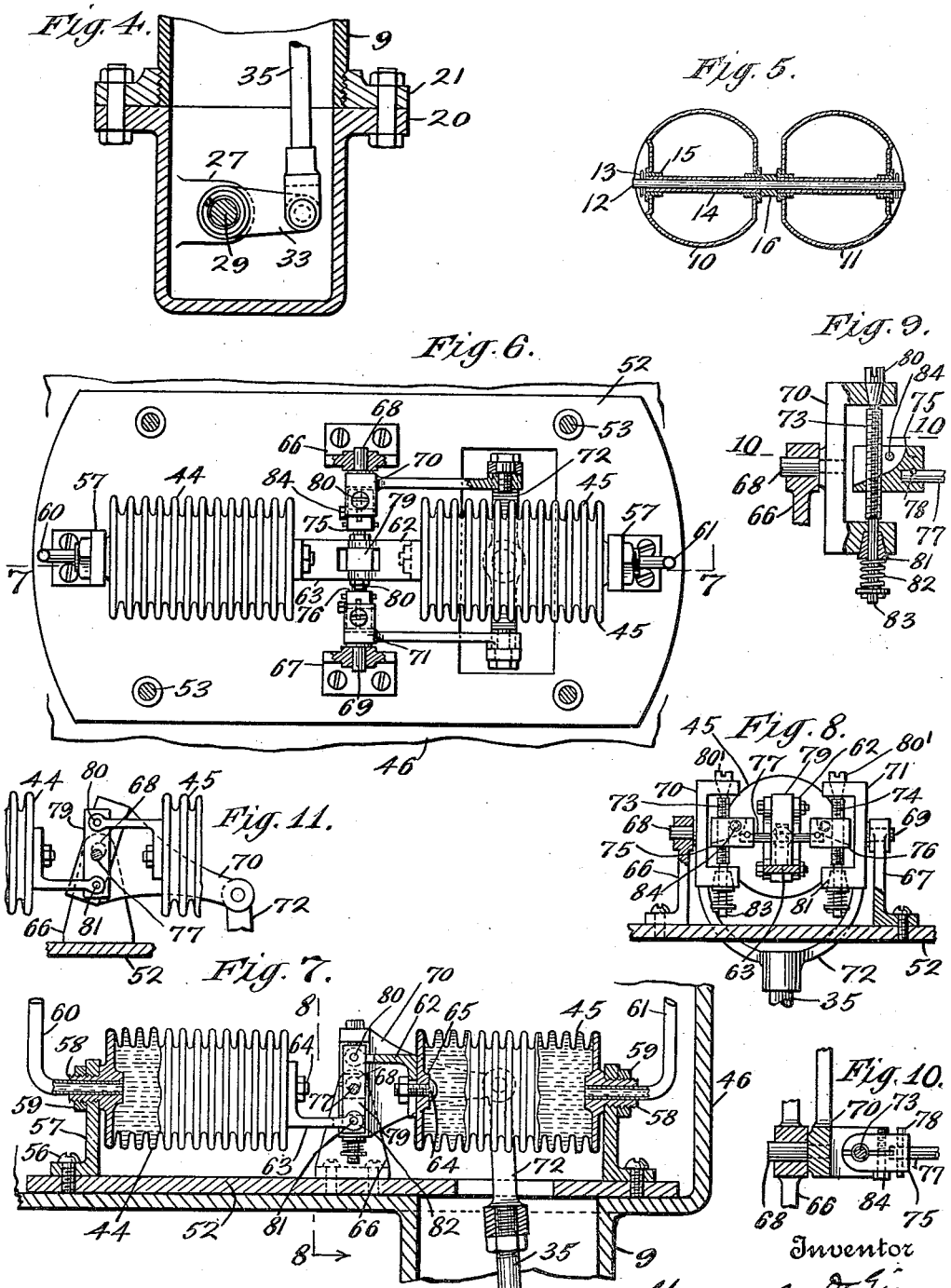

Aug. 12, 1930.                C. A. DE GIERS                1,772,929
                           LIQUID LEVEL INDICATOR
                    Original Filed June 10, 1924    3 Sheets-Sheet 3

Inventor
Clarence A. De Giers
By his Attorneys

Patented Aug. 12, 1930

1,772,929

UNITED STATES PATENT OFFICE

CLARENCE A. DE GIERS, OF NEW YORK, N. Y., ASSIGNOR TO LIQUIDOMETER COMPANY, OF WILMINGTON, DELAWARE, A CORPORATION OF DELAWARE

LIQUID-LEVEL INDICATOR

Application filed June 10, 1924, Serial No. 719,084. Renewed April 5, 1929.

This invention relates to certain improvements in instruments for accurately indicating the amount of liquid contained in a tank or like liquid holding receptacle in which there are two superposed liquid masses, either with or without pressure, or in which the liquid is subjected to heavy pressure, and the present invention has been designed particularly for indicating the contents of the fuel tanks of submarines.

In what is now considered the best practice of submarine construction, the fuel oil which is used in the motors of the submarine for surface running, battery charging, etc. is carried in compartments or tanks of suitable capacity located in the bottom of the boat. For the proper operation of a submarine the boat must be in balance, and this balance should be constant. In the best practice, therefore, as the fuel oil is used it is replaced by water, the tanks or other fuel containers of the submarine being in communication with the sea through a suitable valve or valves, so that as the oil is used up the sea water enters and replaces the used fuel, the proper balance of the boat being thus maintained. There is, therefore, in the fuel containers a mass of fuel oil and a mass of sea water, the fuel oil floating on the sea water. It is very important for the navigating officers of the ship to know accurately the amount of fuel oil present in the tanks. The presence of the two liquids, oil and sea water, which are of different specific gravities, and the pressure developed by the entrance of the sea water produces conditions under which known gauges or indicating devices will not work satisfactorily.

It is the especial object of the present invention to produce an instrument which will work satisfactorily under the pressure conditions arising in the operation of a submarine, and which will accurately indicate the amount of fuel oil which is present in the fuel tanks or other containers of the boat.

A further object of the invention is to produce a construction in which, where heavy pressure conditions are to be met, the operating mechanism is protected from the pressure so that this operating mechanism can be of sufficient delicacy to perform its functions with the accuracy required, and stand up under service conditions.

A further object of the present invention is to produce a float and an indicating instrument so constructed and arranged that the amount of a liquid of one specific gravity floating on the liquid of another specific gravity may be accurately indicated either in the presence or absence of pressure.

A further object of the invention is to provide a construction which shall be durable and able to stand up under heavy service, and for long periods of time without necessitating replacements or repairs.

With these and other objects not specifically referred to in view, the invention consists in certain novel arrangements, parts and combinations which will be described in connection with the accompanying drawings, and the novel features thereof pointed out in the claims hereunto annexed.

In these drawings,—

Figure 1 is a diagrammatic sectional view showing one application of the invention as employed in a fuel tank containing liquids of different gravities which are subject to pressure;

Figure 2 is a side elevation, partly in section and partly broken away, of the tank end of the improved apparatus;

Figure 3 is a sectional plan view on a much enlarged scale, the section being taken on line 3—3 of Fig. 2;

Figure 4 is a vertical sectional detail view, the section being taken on the irregular line 4—4 of Fig. 3;

Figure 5 is a cross-sectional view of the improved float, the view being taken on line 5—5 of Fig. 2;

Figure 6 is a plan view, partly in section, taken on line 6—6 of Fig. 2;

Figure 7 is a side sectional view, partly in elevation, on an enlarged scale, the view being taken on line 7—7 of Fig. 6;

Figure 8 is an end view, partly in section, of part of the mechanism shown in Fig. 7, the view being taken on line 8—8 of that figure in the direction of the arrows;

Figure 9 is a detail sectional view of the adjusting mechanism shown in Fig. 8 on an enlarged scale;

Figure 10 is a detail view of this mechanism taken on line 10—10 of Fig. 9;

Figure 11 is a detail view showing certain of the parts in different positions to that shown in Fig. 7;

Figures 12 and 13 are detail views of the constructions for connecting the float arm with the operating instrument;

Figure 14:
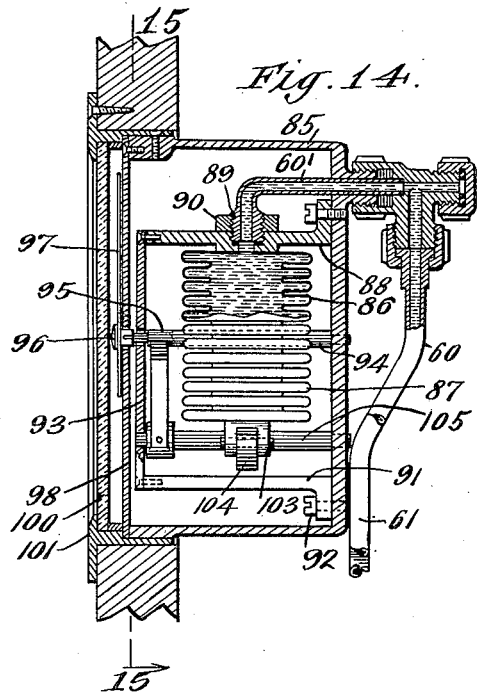
Figure 14 is a side elevation, partly in section, of the indicating instrument preferably employed.

Referring now to these drawings in detail, the invention has been illustrated as used in a submarine in which the fuel oil is under sea water pressure, this being one of the most important uses of the invention. It will be understood, however, that as to certain features the invention is not to be restricted to submarine use, but is applicable for measuring tank contents where either pressure is absent or but a single liquid is contained in the tanks, under heavy pressure. In the drawings a submarine hull has been diagrammatically indicated by the numeral 1. This hull is partitioned off by suitable plates 2 forming what is technically known as the inside deck. The operating mechanism of the boat is carried on this deck but has not been shown as not necessary for an understanding of the invention. The fuel oil is indicated by the numeral 3 and is carried in suitable compartments or tanks below the deck 2. This fuel oil is, as it is used, replaced by sea water, which is indicated by the numeral 4, this sea water having ingress to the hull through an opening 5 which may be controlled by a valve of any suitable construction, not illustrated. The fuel oil, therefore, floats on the sea water and the liquid contents of the hull remains constant, and is under sea water pressure, which of course, varies in accordance with the submergence depth of the boat.

In accordance with the invention, a float of improved construction, indicated generally by the numeral 6, is provided, which is designed to float between the fuel oil and the water, the float sinking through the oil but floating on the water, the difference in the specific gravities of the liquid permitting this to be done.

Where the mechanism is used under heavy pressure conditions, such as exist in the hull of a submarine, an indicating mechanism 7 is provided, mounted in any suitable position for convenient view above the deck 2. This indicator is actuated from the float so that the rise and fall of the float due to change in the fuel contents of the tank is visually indicated. This is accomplished through a mechanism which is of such delicacy as to accurately indicate any change in the position of the float. Where the mechanism is used under pressure conditions, such as are present in the hull of a submarine, this indicating mechanism is protected from the pressure so that it will stand up for long periods of service. The mechanism, generally indicated at 8, is supported on the deck 2, and the connections from the float by which the mechanism is actuated is protected by a housing 9, so that the mechanism is not subject to the tank pressure.

These various mechanisms thus generally referred to are shown in detail in the accompanying figures and will now be fully described, reference first being made to the float and the actuating connections to the operating mechanisms.

While the construction of a float may be somewhat varied, a float construction has been worked out which has proven effective and successful in practice where used to float between two liquids, the specific gravities of which vary but slightly. In the particular construction shown, there are provided two floats 10, 11 (Fig. 5), the floats 10, 11 having combined the required lifting capacity. These two floats are preferably employed instead of one because of the fact that one float of sufficient capacity would be so large that it would be difficult to construct it so as to accurately indicate the tank contents when the tank is nearly full or nearly empty. Furthermore, a stronger construction is effected by this arrangement. These floats 10, 11 are of any desired configuration, being in the construction shown substantially cylindrical in shape. These floats are, furthermore, preferably pivoted on a support so that they will lie in a horizontal position no matter what the inclination of the float arm may be in its rise and fall in the tank. In the particular construction shown, see particularly Fig. 5, these floats are pivotally mounted on a rod 12, being prevented from endwise movement on the rod by pins 13. Leakage into the floats is prevented by providing each float with a bearing tube 14 brazed into a collar 15, which in turn is brazed to the wall of the float.

Secured on this rod between the floats is a float arm 16. The construction described permits the use of this single float arm, which is of certain advantage, particularly in getting into the narrow spaces usually found in the hull of a submarine. In the best constructions, means are provided for compensating for slight variations in the floating capacity of the floats, and while these means may be of various characters, in the particular construction shown there is provided a sliding-weight 17 which may be adjusted on the float arm so as to accurately adjust the float to lie in the required position between the liquids.

In accordance with the invention, where the mechanism is used under pressure conditions, the housing 9, before referred to, is employed, this housing protecting the connections to the operating instrument 8. Where this construction is employed, means must be provided whereby connection may be made between the float arm and the connections in the housing to the operating mechanism, and these connections must be such as to be substantially pressure tight. While the specific arrangement of parts for this purpose may be substantially varied, that shown has been found effective and will be preferred. Referring particularly to Figs. 3, 4, 12 and 13, the float arm 16 is shown as threaded into a yoke 18, the arms of which are pivoted on a cup or socket 19, which is bolted by means of flanges 20, 21 on the respective parts to the lower end of the housing 9. The yoke has split ends 22, 23 in which are positioned projections 24, 25 extending outwardly from the socket, these projections forming bearings on which the yoke rocks. The interior of the socket is provided with thickened portions 26, 27, one of which, as 27, is recessed at 28 to receive one end of a shaft 29. The other end of this shaft projects through and takes bearing in one of the projections 25, before referred to, and inside the projection is provided with a bevelled surface 30 which is held seated against an inclined surface 31 formed in the projection by a coiled spring 30', this construction providing a liquid tight seat and preventing ingress to the interior of the socket.

This shaft is provided with a tapered portion 32 which enters the end of an arm 33 provided with a corresponding taper, the arm being thus rigidly secured on the shaft by means of a nut 34. This arm has connected thereto an actuating rod 35 which is connected to the operating mechanism hereinafter referred to.

The shaft 29 may be rotated from the float arm in any suitable manner. In the particular construction illustrated, the end of the shaft 29 outside the socket 19 is provided with an elongated portion 36 which is formed in one side with a channel or groove 37. One end of this portion 36 is forked, as indicated at 38, 39, in which is pinned on a pin 40 an actuator 41. This actuator at the end opposite the pin is slotted, as indicated at 42, to receive a headed stud 43 which is secured in one of the arms of the yoke 18, before referred to. With this construction as the yoke rises and falls, due to the movement of the float, the shaft 29 is rocked and a movement is given the actuating rod 35. The channel and slot construction of the parts 36, 41 permit a certain amount of lost motion, so that there is no liability of the shaft being pulled off its seat, and a pressure tight joint is assured under all ordinary operating conditions.

With the construction so far described, it will be seen that liquid under pressure is effectually prevented from access to the interior of the housing 9, so that the mechanism with which the actuating rod is connected is in nowise affected by this pressure. In constructions embodying the invention there will be provided a visual indicator which will indicate the fuel contents of the fuel chambers, this indicator being actuated through the movement of the float and the actuating rod before referred to, a suitable mechanism for accurately transmitting the float movement to the indicator being provided. This mechanism generally will include a pair of compressible and expansible chambers, containing a suitable fluid, which are compressed and expanded by the action of the float, the chambers having connections to the indicator for operating the latter. In the best constructions, this actuating mechanism will include means by which the temperature changes in the chambers or in the line to the indicator are compensated for, so that such changes have no effect on the indicator itself. Such a mechanism is shown in the accompanying drawings and includes a pair of bellows-like-chambers 44, 45 of light flexible metal, these chambers being preferably horizontally arranged end to end with a space between them. These chambers are mounted or supported in any suitable manner from the deck 2 of the submarine before referred to. While the particular means for supporting the chambers may be somewhat varied, in the particular construction shown (see Fig. 2), the housing 9, before referred to, has formed integrally therewith a casing 46 which is arranged to extend into an opening 47 cut in the deck 2. This casing 46 at its upper end is formed with a flange 48, and bolted to the deck of the submarine is a liner 49, to which the flange 48 is bolted by bolts 50, suitable packing 51 being provided to insure a tight joint. Within the casing is secured a plate 52, and this plate is secured in place by means of bolts 53 having shoulders 54, the ends of these bolts being threaded through the plate 52 and into the casing 46, the casing 46 being provided, if desired, with bosses 55 to provide sufficient threading depth to insure the proper clamping action of the bolts.

Mounted in this plate 52, as by screws 56, are brackets 57 (Fig. 7) which support one end of the compressible and expansible chambers before referred to. These chambers may be supported in the brackets in any suitable manner. In the particular construction illustrated the outer ends or heads of the chambers are formed with threaded projections 58 which receive clamping nuts 59 by which they may be firmly clamped in the brackets.

These chambers are, as before stated, filled with liquid, and there are arranged liquid connections to the indicator, the connections shown being in the form of pipes 60, 61, these pipes leading from the interior of the chambers.

These chambers are, as shown, spaced apart and at their other ends are provided with oppositely extending brackets 62, 63, these brackets being secured to the head by bolts 64 screwed into threaded bosses 65 formed in the heads, these brackets extending into the space between the chambers. Also mounted on the plate 52 is a pair of spaced brackets 66, 67. Pivotally mounted therein on trunnions 68, 69 is a pair of U shaped supports 70, 71 carried on the ends of the arms of a yoke frame 72 into which is threaded the upper end of the actuator shaft 35, before referred to.

These U shaped frames support adjusting screws 73, 74 on which are carried split blocks 75, 76 threaded on the screws. These blocks have mounted therein in their inner ends a rod 77 fixedly secured in the blocks, as by means of taper pins 78 (see Fig. 9). This rod passes through and turns freely in a link 79 which is pivoted so that it can have a rocking movement on pins 80, 81 passing through ears 82 in the ends of the brackets 62, 63, before referred to.

The rod 77 is supported in the blocks, 75, 76 so as to be off center with the trunnions 68, 69 before referred to, so that a rocking movement of the U frames on the trunnions causes a compressing and expanding movement of the chambers through the blocks 75, 76, the rod 77 and the link 79, this movement corresponding to the movement given the yoke frame 72 by the float.

In the best constructions means will be provided for adjusting the eccentric position of the rod 77 with respect to the trunnions of the yoke frame. While this may be effected in various ways, in the particular construction illustrated, the screws 73, 74, before referred to, are provided at one end with cone shaped heads 80, these heads being recessed so that they may be manipulated by a suitable tool, such as a screw driver. The shanks of the screws pass through loose cones 81 held in place by springs 82' (Fig. 9) engaging between the face of the cone and thrust bolts 83. With this construction the blocks 75, 76 may be raised or lowered on the screws and the eccentric movement varied as desired. To facilitate the movement of the blocks these blocks are partly split, the split portion being clamped or pinched together by suitable screws 84 shown in Fig. 10.

In the best constructions, furthermore, means are provided whereby changes in temperature in the chambers or in the line to the indicator may be compensated for so that any expansion or contraction due to such change is not recorded at the indicator, and in the particular construction shown means are provided whereby the chambers are free to move independently of the connections whereby they are operated from the float arms. The particular means for effecting this in the construction shown is the link 79, before referred to. As shown, for instance, in Fig. 11, this link rocks freely on the rod 77 and contracts or expands one chamber in a like manner as the other chamber contracts or expands due to such temperature changes, this movement not effecting the movement of the rod 77.

Figure 15:
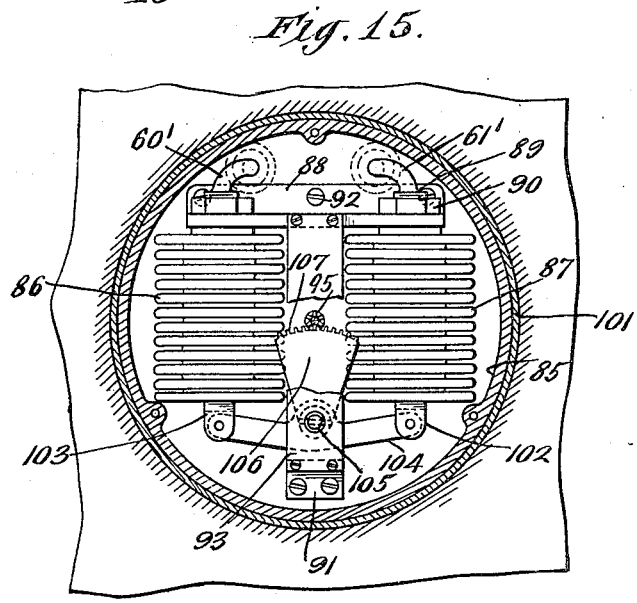
Figure 15 is a front view, partly in section, of the same, the section being taken on line 15—15 of Fig. 14, certain of the parts being removed to show the construction.

Instruments embodying the invention will include an indicator of the visual type. While this indicating instrument may be of various characters, in the particular construction shown, particularly where the instrument is to be used in a submarine, a needle indicator is employed in which the needle is positively actuated to indicate the position of the float, and the amount of liquid in the tank. This indicator is designated in Fig. 1 generally by the numeral 7, and is shown in detail in Figs 14, 15. Referring now to these figures, there is provided a casing 85 in which is located a pair of compressible and expansible chambers 86, 87, these chambers being supported from a bracket 88, the chambers being provided with a threaded extension 89 and clamped onto the bracket by clamping nuts 90. These chambers are connected with the pipes 60, 61, before referred to, by short pipes 60', 61'. These chambers, the pipes 60, 61 and the chambers 44, 45 are filled with liquid, thus in effect forming a liquid holding circuit so that any movement due to the movement of chambers 44, 45 is transmitted to the chambers 86, 87 and a corresponding compressing and expanding movement given these chambers. This movement may be translated to the indicating needle in any suitable manner. In the best constructions, where strength and rigidity are required, particularly in the case of large instruments, this will be a positive movement. In the particular construction shown, there is provided a second bracket 91, the brackets 88 and 91 being secured to the inner wall of the casing by screws 92 and being joined at their outer ends by a face bar 93. This bar and the rear wall of the casing form a support for a shaft 94 which has a portion formed with gear teeth 95. This shaft has frictionally secured thereto, as by a stud 96, an indicating needle 97, this needle oscillating in front of a face plate 98 on which suitable indicating indicia 99, shown in Fig. 1, are marked. The casing may, if desired, be covered with a glass 100 held in position by a flange 101.

The shaft 94 is operated by the movement of the chambers in any suitable manner. In the particular construction shown the chambers have secured to their lower ends yokes 102, 103 in which are secured the ends of a rocker arm 104 fast on a rock shaft 105, this rock shaft taking bearing in the bar 93, before referred to, and the rear end of the casing. Fast on this rock shaft is a segment 106 provided with teeth 107 which are in mesh with the teeth 95 on the shaft 94, before referred to. With this construction as one chamber is compressed and the other expanded the rock shaft is operated to cause the sector to rotate the needle and thus indicate the change which has taken place in the fuel tank.

While the invention has been shown and described in its preferred form, it will be understood that the structure shown and described has a wide range of usage and is not to be restricted particularly to use in a submarine. It will be further understood that various changes may be made in the specific structure of the various parts by which the invention is carried into effect without departing from the features of the invention defined in the appended claims.

Certain features of invention disclosed herein are disclosed and claimed in my copending application Serial No. 719,082, filed June 10, 1924.

What I claim is:

1. The combination of a tank adapted to contain liquid under pressure, a pair of compressible and expansible liquid holding chambers, means to support the chambers and to prevent the access of tank pressure thereto, a float in the tank having a float arm, means to connect the float arm and the chambers for compressing and expanding the latter on the movement of the float, means for protecting the connecting means from tank pressure, a pressure responsive indicator, and pipe means to connect from the chambers to the indicator.

2. The combination of a tank adapted to contain liquid under pressure, a pair of compressible and expansible liquid holding chambers, means to support the chambers and to prevent the access of tank pressure thereto, a float in the tank having a float arm, a housing in the tank, connecting means in the housing between said float arm and said chambers for expanding and compressing the chambers, liquid tight connections between the float arm and the connecting means in the housing, a pressure responsive indicator, and pipe connections from the chambers to the indicator.

3. The combination of a tank adapted to contain liquid under pressure, a pair of compressible and expansible liquid holding chambers, means to support the chambers and to prevent the access of tank pressure thereto, a float in the tank having a float arm, a housing in the tank, an operating rod in the housing, an operating member, means to connect said member to the rod and to connect the chambers for compressing and expanding the latter, a shaft in the housing and projecting therethrough, means for preventing leakage of liquid past the shaft, means to connect the shaft and the float arm for rocking the shaft, a pressure responsive indicator, and pipe connections from the chambers to the indicator.

4. The combination of a tank adapted to contain liquid under pressure, a pair of compressible and expansible liquid holding chambers, means to support the chambers and to prevent the access of tank pressure thereto, a float in the tank having a float arm, a housing in the tank, an operating rod in the housing, an operating member, means to connect said member to the rod and to connect the chambers for compressing and expanding the latter, a shaft in the housing and projecting beyond the housing, a lost motion connection between the shaft and the float arm, a pressure responsive indicator, and pipe connections from the chambers to the indicator.

5. The combination of a closed tank adapted to contain liquid under pressure, a housing secured to a wall of the tank and extending into the tank, said housing having a chambered end, a pair of compressible and expansible liquid holding chambers supported in the housing chamber, a float in the tank having a float arm, an operating rod in the housing, an operating member, means to connect said member to the rod and to connect the chambers for compressing and expanding the latter, a shaft in the housing and projecting therethrough, means to connect said shaft with the rod, means for preventing leakage of liquid past the shaft, means to connect the float arm to the shaft for rocking the latter, a pressure responsive indicator, and pipe connections from the chambers to the indicator.

6. The combination of a tank adapted to contain two liquids of different specific gravities, a float in the tank capacitated to float between the liquids, a float arm, a pair of compressible and expansible liquid holding chambers, means to support said chambers, means to connect said chambers with the arm so as to be expanded or contracted by the movement of the float, a pressure responsive indicator, and pipe connections from the chambers to the indicator.

7. The combination of a closed liquid holding receptacle adapted to contain two liquids of different specific gravities under pressure, a pair of compressible and expansible liquid holding chambers, means to support the chambers and to prevent the access of tank pressure thereto, a float in the tank capacitated to float between the liquids, a float arm, connections between the float arm and the chambers for compressing and expanding the latter on the movement of the float, means for protecting the connections from tank pressure, a pressure responsive indicator, and pipe connections from the chambers to the indicator.

8. The combination of a tank adapted to contain liquid under pressure, a pair of compressible and expansible liquid holding chambers, means to support the chambers and to prevent the access of tank pressure thereto, a float in the tank having a float arm, means to connect the float arm and the chambers for compressing and expanding the latter on the movement of the float, means for protecting the connections from tank pressure, pipes connected with the chambers, a second pair of compressible and expansible liquid holding chambers to which the pipes lead, an indicator, and connecting means from the second pair of chambers to the indicator, through which the compressing and expanding movement of these chambers is transmitted to the indicator.

9. The combination of a tank adapted to contain liquid under pressure, a pair of compressible and expansible liquid holding chambers, means to support the chambers and to prevent the access of tank pressure thereto, a float in the tank having a float arm, means to connect the float arm and the chambers for compressing and expanding the latter on the movement of the float, means for protecting the connections from tank pressure, pipes connected with the chambers, a second pair of compressible and expansible liquid holding chambers to which the pipes lead, an indicator, a shaft, means to rotate said shaft under the control of the compressing and expanding movement of the chambers, and a sector and means to actuate said sector by the movement of the shaft.

10. The combination of a closed receptacle adapted to contain liquid under pressure, a pair of compressible and expansible liquid holding chambers, means to support the chambers and to prevent the access of tank pressure thereto, a float in the tank having a float arm, means to connect the float arm and the chambers for compressing and expanding the latter on the movement of the float, a pressure responsive indicator, pipe connections from the chambers to the indicator, and means for permitting an expanding or contracting movement of the chambers without causing a movement of the indicator to compensate for temperature changes.

11. The combination of a closed liquid holding receptacle adapted to contain two liquids of different specific gravities under pressure, a pair of compressible and expansible liquid holding chambers, means to support the chambers and to prevent the access of tank pressure thereto, a float in the tank having a float arm, means connecting the float arm and the chambers for compressing and expanding the latter on the movement of the float, a pressure responsive indicator, pipe connections from the chambers to the indicator, and means whereby the contracting or expanding movements in the chambers may take place without being indicated at the indicator to compensate for temperature changes.

12. The combination of a closed liquid holding receptacle adapted to contain liquid under pressure, a pair of compressible and expansible liquid holding chambers arranged horizontally end to end and spaced apart, means to support the chambers and to prevent the access of tank pressure thereto, a float in the tank having a float arm, an actuator rod, means to connect said rod to the float arm, an eccentric connection between the actuator rod and the chambers whereby the latter are compressed or expanded by the movement of the float, and means associated with said eccentric connection whereby the chambers may have a compressing and expanding movement independently of the movement imparted to them by the actuator rod to compensate for temperature changes.

13. The combination of a closed liquid holding receptacle adapted to contain liquid under pressure, a pair of compressible and expansible liquid holding chambers arranged horizontally end to end, means to support the chambers and to prevent the access of tank pressure thereto, a float in the tank having a float arm, an actuator rod, means to connect said rod to the float arm, an eccentric connection between the actuator rod and the chambers whereby the latter are compressed or expanded by the movement of the float, means for adjusting the eccentric connection, and means associated with said eccentric connection whereby the chambers may have a compressing and expanding movement independently of the movement imparted to them by the actuator rod to compensate for temperature changes.

In testimony whereof, I have hereunto set my hand.

CLARENCE A. DE GIERS.

CERTIFICATE OF CORRECTION.

Patent No. 1,772,929.　　　　　　　　　　　　Granted August 12, 1930, to

CLARENCE A. de GIERS.

It is hereby certified that the assignee in the above numbered patent was erroneously described and specified as "Liquidometer Company", whereas said assignee should have been described and specified as The Liquidometer Corporation, as assignee by mesne assignments of the entire interest in said invention, as shown by the records of assignments in the office; and that the said Letters Patent should be read with this correction therein that the same may conform to the record of the case in the Patent Office.

Signed and sealed this 27th day of January, A. D. 1931.

(Seal)　　　　　　　　　　　　　　　　　　　　M. J. Moore,
　　　　　　　　　　　　　　　　　　　　Acting Commissioner of Patents.